United States Patent [19]
Kagawa et al.

[11] Patent Number: 5,838,654
[45] Date of Patent: Nov. 17, 1998

[54] OPTICAL RECORDING MEDIUM HAVING A SPECIFIED RANGE OF PIT WIDTHS AND PIT DEPTHS

[75] Inventors: Masaki Kagawa; Katsuhiko Ohtomo, both of Miyagi, Japan

[73] Assignee: Sony Corporation, Yokyo, Japan

[21] Appl. No.: 851,477

[22] Filed: May 5, 1997

[30] Foreign Application Priority Data

May 20, 1996 [JP] Japan ................................. 8-125151

[51] Int. Cl.⁶ ....................................................... G11B 7/24
[52] U.S. Cl. ..................................... 369/275.1; 369/275.4
[58] Field of Search .............................. 369/275.1, 275.4, 369/275.2, 275.3, 58, 44.26, 272, 273

[56] References Cited

U.S. PATENT DOCUMENTS

| | | | |
|---|---|---|---|
| 5,204,852 | 4/1993 | Nakagawa et al. | 369/275.1 |
| 5,477,527 | 12/1995 | Tsuchiya et al. | 369/275.4 |
| 5,499,229 | 3/1996 | Murakami et al. | 369/275.4 |
| 5,661,706 | 8/1997 | Ohtomo | 369/54 |

FOREIGN PATENT DOCUMENTS

| | | |
|---|---|---|
| 0414429 A2 | 2/1991 | European Pat. Off. . |
| 0664541 A1 | 7/1995 | European Pat. Off. . |
| WO 97/24719 | 7/1997 | WIPO . |

*Primary Examiner*—Tan Dinh
*Attorney, Agent, or Firm*—Limbach & Limbach L.L.P.

[57] ABSTRACT

Even if grooves are, in order to improve productivity, omitted from an optical recording medium having pits indicating information signals formed in at least a portion of recording tracks of the optical recording medium, signals having satisfactorily high levels required to perform tracking control are attempted to be obtained. The number of regions of the recording tracks in which the pits are formed is made to be larger than the number of regions in which no pit is formed. Specifically, since "0" has higher appearance probability than "1" in a case of a binary information signal consisting of "0" and "1", pits are formed at positions corresponding to "0" of the information signal.

20 Claims, 12 Drawing Sheets

OPTICAL RECORDING MEDIUM HAVING A SPECIFIED RANGE OF PIT WIDTHS AND PIT DEPTHS

BACKGROUND OF THE INVENTION

1. Field of the Invention

The present invention relates to an optical recording medium having recording tracks in which pits indicating information signals are formed, and more particularly to an optical recording medium from which a signal required to perform tracking control can satisfactorily be obtained even if no groove is provided.

2. Description of the Related Art

In recent years, research and developments of an optical information recording method, which uses a light beam to write an information signal on a recording medium and which uses a light beam to read an information signal from the recording medium, has been performed in a variety of organizations in the information recording field. The optical information recording method has a variety of advantages in that non-contact recording and reproducing can be performed to and from a recording medium, significantly high recording density can be realized as compared with that of a magnetic recording method, adaptations to a variety of recording methods, such as read-only mediums, additional writing mediums and reloadable mediums can be permitted, and large capacity recording can be realized with a low cost. Therefore, the optical information recording method has been widely used in the information recording field.

An optical recording medium adapted to the optical information recording method is generally formed into a disc shaped having a main side provided with a spiral track or concentric tracks formed therein. The disc shape optical recording medium is generally called an family of optical disks.

The optical disk includes a read-only optical disk having an information signal written previously to prevent additional data writing and reloading of information signals. The read-only optical disk, as shown in FIG. 1, is provided with only pits 101 forming a pit and projection pattern indicating information signals, the pits 101 being formed on the surface of the read-only optical disk. The pits 101 are formed by embossing or the like.

The information signal is reproduced from the optical disk having the foregoing structure while performing tracking control by detecting light beams reflected and diffracted by the pits 101. Since the read-only optical disk having only the pits 101 forming the pit and projection pattern indicating information signals has a simple structure, the foregoing read-only optical disk can easily be manufactured. Thus, the read-only optical disk has excellent productivity. Specifically, the optical disks of the foregoing type are exemplified by digital audio disks having music information or the like recorded thereon and digital video disks having image information or the like recorded thereon.

Moreover, the family of optical disks includes recording optical disks permitting additional writing of information signals and reloading of the same, such as magneto-optical disks each employing a magneto-optical recording method to permit an information signal to be written additionally and to be reloaded, and phase change type optical disks which use and phase change of the medium to permit additional writing of information signals and reloading of the same. Since the foregoing optical disks are arranged not to usually form pits in the pit and projection pattern for indicating information signals in the portion in which the information signals are written, tracking control cannot be performed by detecting light beams reflected and diffracted by the pits.

The optical disk of the foregoing type, as shown in FIG. 2, has a structure such that grooves 102 which are guide grooves for performing the tracking control are continuously formed along the tracks. When information signals are recorded or reproduced, light beams reflected and diffracted by the grooves 102 are detected so that the tracking control is performed. At this time, the information signals are written on lands 103 which are projecting portions between the grooves 102.

Also the optical disks of the type having the grooves 102 formed thereon are required to be formed into read only optical disks. When the read-only optical disk having the grooves 102 is manufactured, pits 101 in the form of a pit and projection pattern indicating information signals are formed in the lands 103 between the grooves 102, as shown in FIG. 3. However, since the optical disk of the foregoing type must form both of the pits 101 and the grooves 10, the structure becomes too complicated and too precise as compared with the optical disk having only the grooves 102. Thus, there arises a problem in that the optical disk of the foregoing type cannot easily be manufactured.

Since an optical disk having both of the pits 101 and the grooves 102 has a structure such that the depth of each of the pits 101 and that of each of the grooves 102 are different from each other, a metal master plate, called a stamper, for molding the substrate must have projections and pits having different heights formed therein. When the stamper is manufactured, the projections and the pits having different heights cannot easily be formed. Thus, the manufacturing yield of the stamper deteriorates.

The substrate for the optical disk having both of the pits 101 and the grooves 102 cannot easily be molded by the stamper as compared with the process for manufacturing the optical disk having only the pits 101 and that for manufacturing the optical disk having only the grooves 102.

That is, the substrate of the optical disk having only the pits 101 can be manufactured by introducing resin into a stamper having only projections corresponding to the pits 101. Also the substrate of the optical disk having only the grooves 102 can be manufactured by introducing resin into a stamper having only projections corresponding to the grooves 102. On the other hand, the substrate of the optical disk having both of the pits 101 and the grooves 102 is manufactured by introducing resin into a stamper having projections respectively corresponding to both of the pits 101 and the grooves 102. Therefore, the resin is introduced into a very small region in the stamper. As a result, the substrate of the optical disk having both of the pits 101 and the grooves 102 cannot easily be manufactured as compared with the process for manufacturing the substrate of the optical disk having only the pits 101 and that for manufacturing the substrate of the optical disk having only the grooves 102.

As described above, the read-only optical disk corresponding to the specification of the optical disk having the grooves 102 formed thereon cannot easily be manufactured, thus causing the manufacturing cost to be enlarged. As a result, the read-only optical disk of the foregoing type has not been used widely.

The standard relating to the tracking control of an optical disk is usually regulated to be capable of obtaining a signal required to perform the tracking control and having a sufficiently high level. Therefore, the existence of the grooves 102 is not required even for the optical disk of the foregoing type. It might therefore be considered feasible to form only the pits 101 while omitting the grooves 102. If the foregoing structure can be realized, the optical disk of this type can easily be manufactured and the manufacturing cost can significantly be reduced.

However, if the grooves 102 are simply omitted from the optical disk designed to form the grooves 102, there arises a problem in that the tracking control cannot normally be performed. The problem will now be described.

The tracking control of an optical disk usually uses push-pull signal PP as a signal for detecting a tracking error and cross tracking signal CTS as a signal for detecting the number of tracks crossed by the moving beam.

The push-pull signal PP is obtained such that light beams reflected and diffracted by pits 101 and grooves 102 are, as shown in FIG. 4, received by two light receiving portions 111 and 112 of a bisected light quantity detector 110 disposed symmetrically with respect to the center of the track. The push-pull signal PP is obtained as the difference in the outputs from the two light receiving portions 111 and 112. At this time, distribution of the reflected and diffracted light beams is changed in accordance with the relative position between the beam spot and the track. The difference in the outputs from the two light receiving portions 111 and 112 reflects the foregoing distribution. Therefore, a positional error of a beam spot, that is, the tracking error is detected in response to the push-pull signal PP.

On the other hand, a sum signal of the signals output from the two light receiving portions 111 and 112 is usually used as the cross tracking signal CTS. The cross tracking signal CTS is fetched as the quantity of returned light when the beam spot has been moved vertically or diagonally with respect to the direction of the track. In response to the cross tracking signal CTS, the number of tracks crossed by the beam spot moved in the seeking operation or the like is counted. Thus, the distance for which the beam spot has been moved and the moving speed of the beam spot can be detected.

The optical disk having the grooves 102 formed thereon generates the push-pull signal PP and the cross tracking signal CTS from the light beams reflected and diffracted by the grooves 102. Assuming that the wavelength of a light beam for use to record or reproduce data is $\lambda$ and the refractivity of the substrate is n, the maximum output of the push-pull signal PP can be obtained when the depth of the grooves 102 is about $\lambda/(8n)$. The maximum output of the cross tracking signal CTS can be obtained when the depth of the grooves 102 is about $\lambda/(4n)$. The depth of the grooves 102 of the optical disk is usually made to be about $\lambda/(7n)$ in order to detect both of the push-pull signal PP and the cross tracking signal CTS at high levels.

If an optical disk has both of the pits 101 and the grooves 102, the depth of the pits 101 and that of the grooves 102 are made to be different from each other in order to distinguish the signal obtained from the pits 101 and the signal obtained from the grooves 102. As a matter of course, the depth of the pits 101 must be determined in such a manner that a large output of a reproduction signal can be obtained. In consideration of the above-mentioned factors, the depth of the pits 101 is made to be about $\lambda/(4n)$ in a case where both of the pits 101 and the grooves 102 are formed.

The read-only optical disk having only the pits 101 must generate the push-pull signal PP and the cross tracking signal CTS as well as the reproduction signal from the light beams reflected and diffracted by the pits 101. Accordingly, the depth of the pits 101 is usually determined to be $\lambda/(5n)$ to detect the foregoing signals at high levels.

The relationship between the positions of the beam spot of the foregoing optical disks and the push-pull signal PP is shown in FIGS. 5 and 6. FIG. 5 shows an example of the push-pull signal PP which is generated by the grooves 102 of the optical disk having the pits 101 and the grooves 102. FIG. 6 shows an example of the push-pull signal PP which is generated by the pits 101 of the optical disk having only the pits 101. As shown in FIGS. 5 and 6, the push-pull signal PP generated by the optical disk having the grooves 102 and the push-pull signal PP generated by the optical disk having only the pits 101 have opposite polarities.

In the example shown in FIG. 5, the push-pull signal PP has negative values when the beam spot has been shifted to the left and the push-pull signal PP has sensitive values when the beam spot has been shifted to the right. In the example shown in FIG. 6, the push-pull signal PP has positive values when the beam spot has been shifted to the left and the push-pull signal PP has negative values when the beam spot has been shifted to the right.

Therefore, when the optical disk having only the pits 101 is reproduced by a drive unit adapted to the optical disk having the grooves 102, the tracking control cannot normally be performed. Specifically, the servo acts to move the optical head to the right in a case where the optical head must be moved to the left. When the optical head must be moved to the right, the servo acts to move the optical head to the left.

As described above, if the grooves 102 are simply omitted from the optical disk designed to have the grooves 102, the polarity of the push-pull signal PP is unintentionally inverted. Thus, the tracking control cannot normally be performed.

To solve the above-mentioned problem, the applicant of the present invention has disclosed an optical disk in Japanese Patent Application No. 8-59612 in which the depth of the pits 101 is made to be $\lambda/(4n)$ to $\lambda/(2n)$ and thus the grooves 102 are omitted from the read-only region.

FIG. 7 shows the relationship between the output levels of the push-pull signal PP obtained from light reflected and diffracted by the pits 101 and the depth of the pits 101. The push-pull signal PP obtainable from light reflected and diffracted by the pits 101 has a peak when the depth of the pits 101 is about $\lambda/(8n)$. Then, the level of the push-pull signal PP is lowered as the pits 101 are deepened. When the depth of the pits 101 is about $\lambda/(4n)$, the level of the push-pull signal PP is made to be zero.

If the depth of the pits 101 is further enlarged, the phase of the push-pull signal PP is inverted and the output level of the push-pull signal PP is enlarged. When the depth of the pits 101 is about $(3\lambda)/(8n)$, the level of the push-pull signal PP again reaches a peak. Then, the level of the push-pull signal PP is lowered as the pits 101 are deepened. When the depth of the pits 101 is about $\lambda/(2n)$, the level is again made to be zero. As described above, the polarity of the push-pull signal PP obtainable from light reflected and diffracted by the pits 101 is inverted when the pits 101 are deepened.

Therefore, the optical disk having the structure such that the depth of the pits 101 is made to be $\lambda/(4n)$ to $\lambda/(2n)$ and disclosed as described above enables push-pull signal PP having the polarity inverted from the polarity of the push-pull signal PP obtainable from light reflected and diffracted by the pits 101 and having a shape similar to the push-pull signal PP obtainable from light reflected and diffracted by the grooves 102 to be obtained from light reflected and diffracted by the pits 101.

As a recording method adapted to an optical disk, pit position modulation has been widely employed. The pit position modulation records a signal coded as ". . . 1001000010001 . . ." such that pits are formed at positions corresponding to "1" and no pit is formed at each position corresponding to "0" and makes these portions to be flat.

When information signals are reproduced from an optical disk employing the pit position modulation, positions of the pits are detected to reproduce the information signals. That is, the positions from which the pits have been detected are made to be "1" and the flat positions having no pit are made to be "0" when the information signal is reproduced.

When the pit position modulation is employed, for example, (2, 7) RLL code is formed such that at least two "0" appear between "1" and "1" and thus not more than seven "0" appear. Therefore, in general, the flat portions formed between the pits, that is, portions corresponding to "0" have higher appearance probability as compared with the pits formed at the positions corresponding to "1".

The structure according to the above-mentioned disclosure is arranged such that the depth of the pits is made to be $\lambda/(4n)$ to $\lambda/(2n)$ to omit the grooves from the read only region to obtain signals required in the tracking control from only the pits. If the signals required to perform the tracking control are obtained from only the pits, the quantity of signals obtainable from the pits is unsatisfactorily large in the case where the number of the flat portions is larger than that of the pit portions. As a result, signals having sufficiently high levels cannot easily be obtained. Therefore, the above-mentioned disclosure structured such that the signals required to perform the tracking control are obtained from only the pits has a problem in that sufficiently high level signals cannot easily be obtained when the above-mentioned structure is adapted to an optical disk employing the pit position modulation.

SUMMARY OF THE INVENTION

In view of the foregoing, an object of the present invention is to overcome the foregoing problems experienced with the conventional structure and to provide an optical recording medium from which signals having a satisfactorily high level required to perform tracking control can be obtained even if grooves are omitted in order to improve productivity.

In order to achieve the above-mentioned object, according to one aspect of the present invention, there is provided an optical recording medium comprising pits formed in at least a portion of recording tracks and indicating information signals, wherein the refractivity of a substrate of the optical recording medium is n and the wavelength of light for use to reproduce data is $\lambda$, the depth of the pits is included in a range from $\lambda/(4n)$ to $\lambda/(2n)$ and the width of each pit is included in a range from 0.3 to 0.6 $\mu$m, and the number of regions in the recording tracks in which the pits are formed is larger than regions in which no pit is formed.

The foregoing optical recording medium has the structure such that the number of regions in the recording tracks in which the pits are formed is larger than the number of regions in which no pit is formed. That is, the foregoing optical recording medium has the structure such that the appearance probability of the pits is raised. Therefore, the foregoing optical recording medium enables signals required to perform tracking control to be detected with a high level only from light reflected and diffracted by the pits.

The structure in which the number of the regions having the pits is larger than the number of the regions having no pit can be realized by forming pits at positions corresponding to "0" of the information signal. In general, "0" has higher appearance probability than "1" in a case of a binary information signal consisting of "0" and "1" Therefore, pits are formed at positions corresponding to "0" of the information signal so that the number of the regions having the pits is made to be larger than the number of the regions having no pit.

Other objects, features and advantages of the invention will be evident from the following detailed description of the preferred embodiments described in conjunction with the attached drawings.

DETAILED DESCRIPTION OF THE PREFERRED EMBODIMENTS

Embodiments of the present invention will now be described with reference to the drawings. Note that the present invention is not limited to the following embodiments. As a matter of course, arbitrary modification is permitted within the scope of the present invention.

An optical recording medium according to this embodiment is a read-only optical disk conforming to ISO/IEC 13549 or ISO/IEC 13963. Note that the present invention is not limited to the optical disk conforming to the foregoing standards.

ISO/IEC 13549 is a standard arranged such that information signals in a quantity of 1.3 Gbytes are stored on two sides of a magneto-optical disk having a diameter of 130 mm. ISO/IEC 13963 is a standard arranged such that information signals in a quantity of 230 Mbyte are stored on one side of a magneto-optical disk having a diameter of 90 mm. ISO/IEC 13549 and ISO/IEC 13963 (these standards are collectively called double density MO standards) have a regulation that wavelength λ of light for use to reproduce data is 770 nm to 795 nm. In the double density MO standard, the track pitch is regulated to be 1.39 μm, the recording density is made to be 0.86 μm/bit and the modulation method is (2, 7) RLL pit position modulation.

Figure 1:
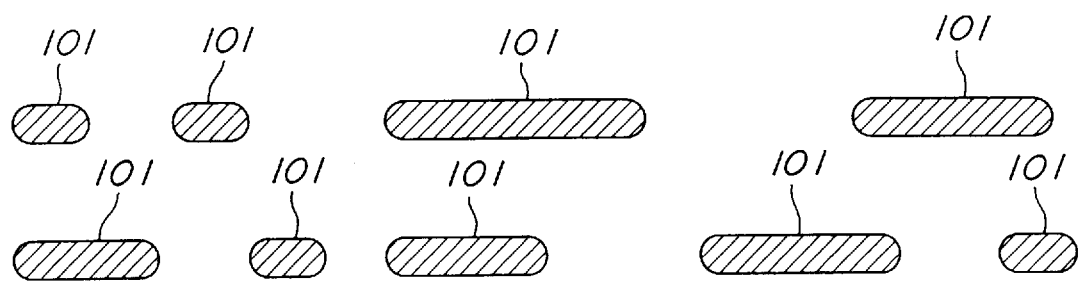
FIG. 1 is a schematic view showing an example of a format of a conventional read-only optical disk.
Figure 2:
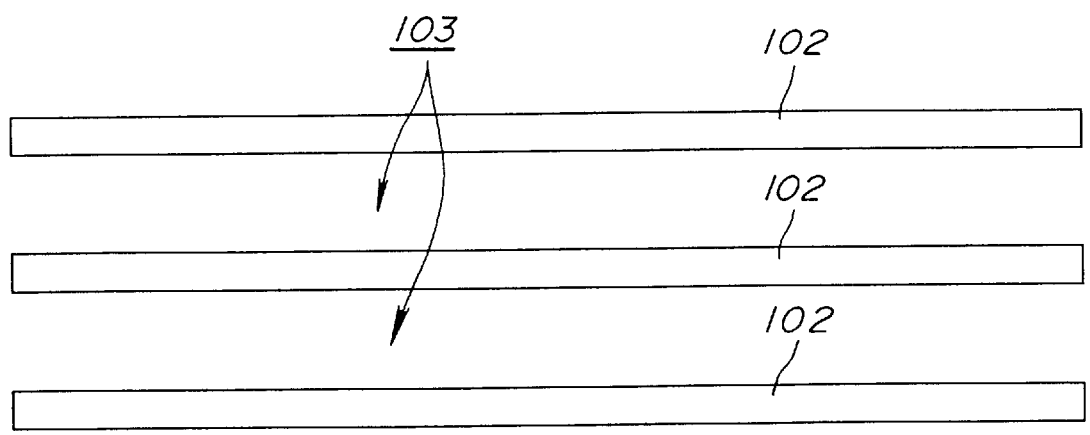
FIG. 2 is a schematic view showing an example of a conventional recording optical disk.
Figure 3:
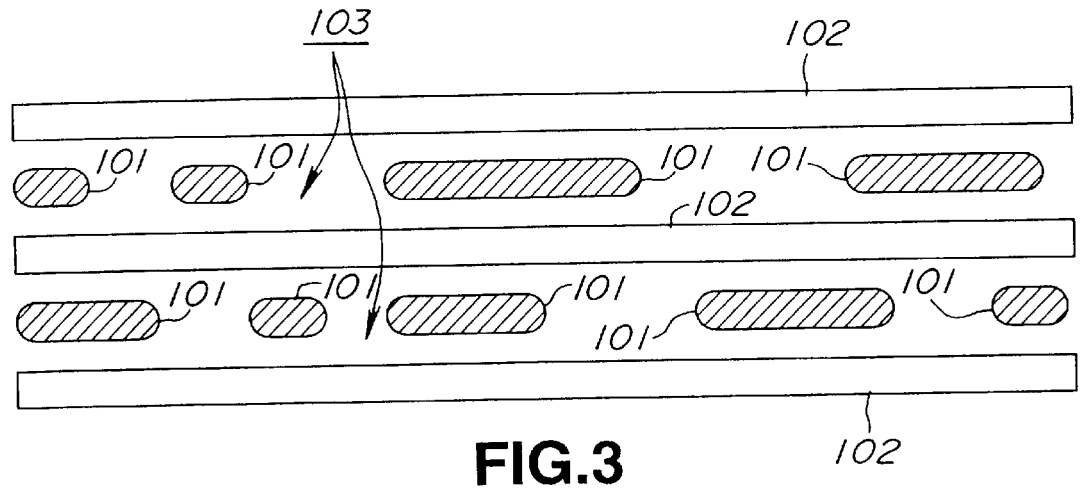
FIG. 3 is a schematic view showing an example of a format when the conventional recording optical disk is made to be a read-only type disk.
Figure 4:
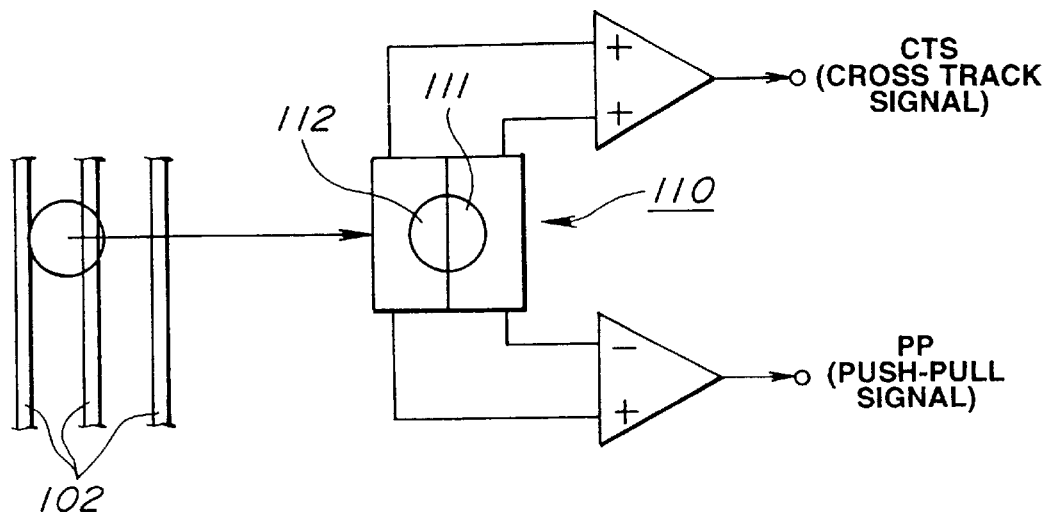
FIG. 4 is a diagram showing a push-pull signal and a cross tracking signal.
Figure 5:
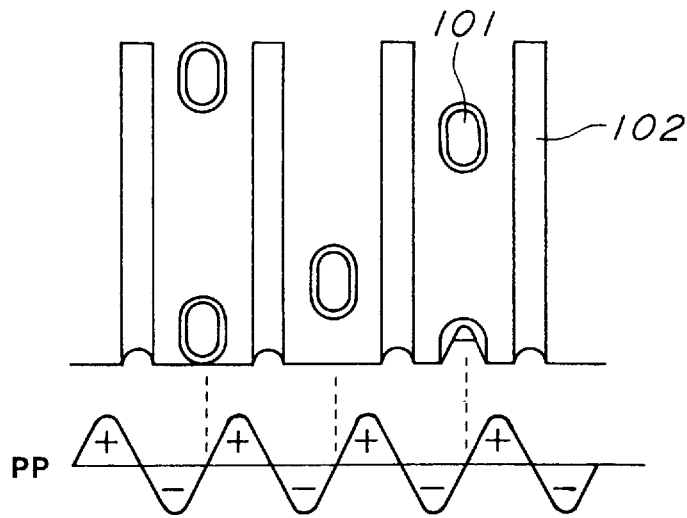
FIG. 5 is a diagram showing a push-pull signal obtained from an optical disk having both of pits and grooves.
Figure 6:
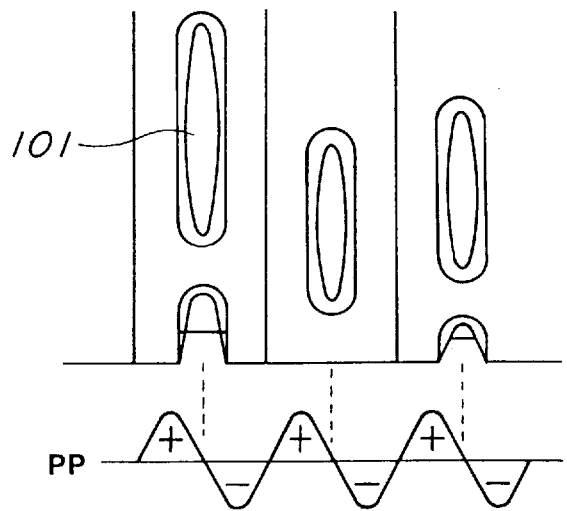
FIG. 6 is a diagram showing a push-pull signal obtained from an optical disk having only pits.
Figure 7:
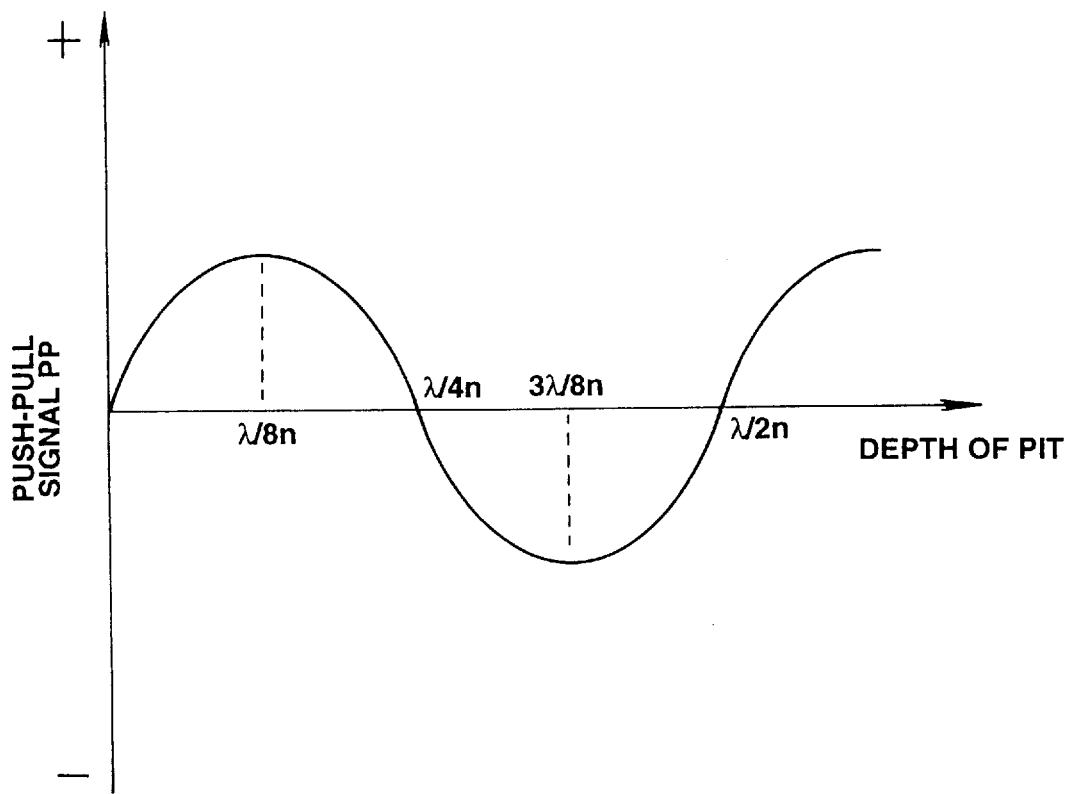
FIG. 7 is a graph showing the relationship between the push-pull signal and the depth of the pits.
Figure 8:
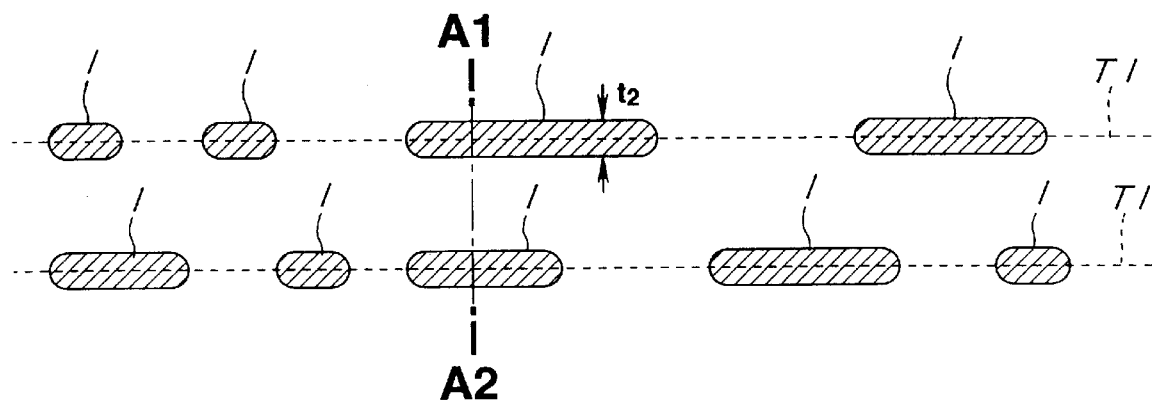
FIG. 8 is a schematic view showing an example of a format of an optical disk according to the present invention.
Figure 9:
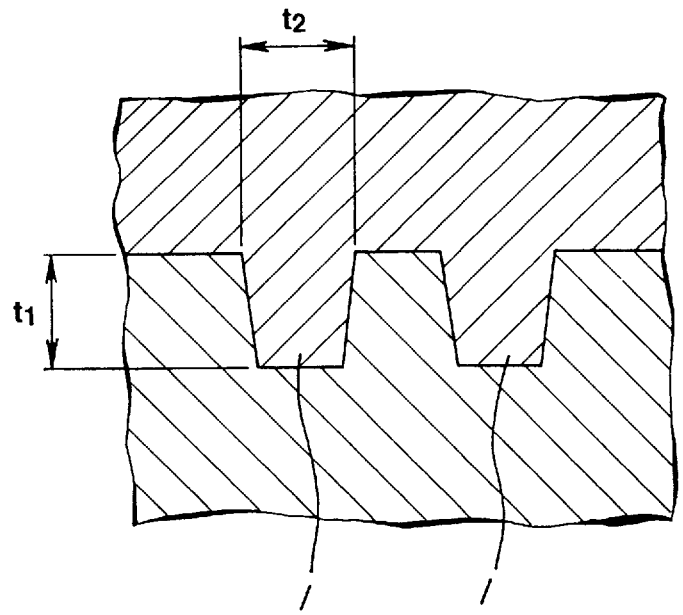
FIG. 9 is a cross sectional view taken along line A1–A2 shown in FIG. 8.

The optical disk conforming to the double density MO standard and according to this embodiment, as shown in FIGS. 8 and 9, has pits 1 previously formed along recording tracks T1 in at least a portion of the surface thereof and indicating information signals. In a portion in which the pits 1 are formed, no groove is formed.

Assuming that the refractivity of the substrate of the foregoing optical disk is n and the wavelength of light for use to reproduce data is λ, the depth t1 of the pits 1 is included in a range from λ/(4n) to λ/(2n). Since the productivity of the disks deteriorates if the depth t1 of the pits 1 is excessively large, it is preferable that the depth t1 of the pits 1 be about (3λ)/(8n). The width t2 of the pits 1 is included in a range from 0.3 to 0.6 μm. The optical disk according to this embodiment has the pits 1 formed at positions corresponding to "0" of the information signal.

In order to make a comparison, the optical disk disclosed in Japanese Patent Application No. 8-59612 will now be described with reference to FIG. 10.

Figure 10:
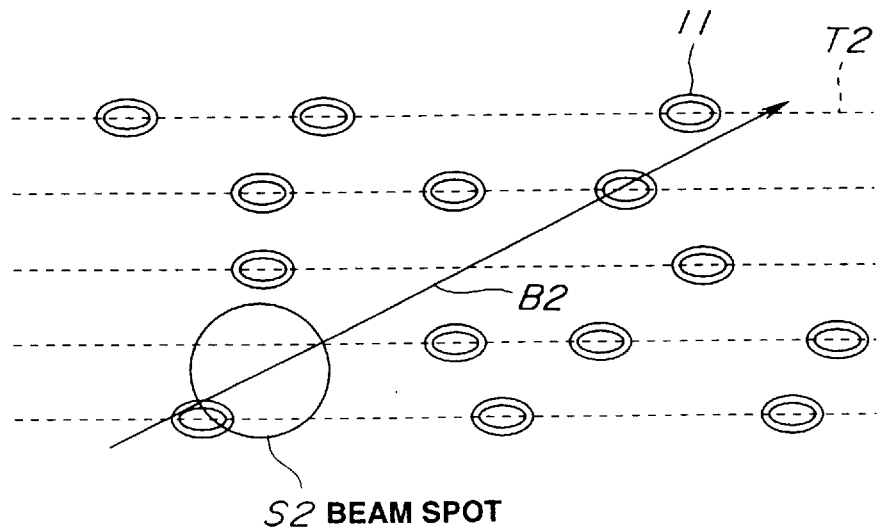
FIG. 10 is a schematic view showing an optical disk disclosed previously.

FIG. 10 is a schematic view showing a read-only region of the optical disk disclosed as described above such that pits 11 formed in the recording tracks T2 are shown. A circle S2 shown in FIG. 10 indicates a beam spot made incident on the optical disk when reproduction is performed, and an arrow B2 indicates a state of movement of the beam spot when seeking is performed.

As shown in FIG. 10, the optical disk according to the foregoing disclosure has no groove and is provided with only the pits 11 to obtain signals required to perform tracking control from only light reflected and diffracted by the pits 11. Similarly to the conventional optical disk conforming to the double density MO standard, the foregoing optical disk has pits at positions corresponding to "1" of the information signal.

The modulation method using the (2, 7) RLL code is arranged to express all information with combinations of six patterns 3T (100), 4T (1000), 5T (10000), 6T (100000), 7T (1000000) and 8T (10000000). If the foregoing combinations appear impartially, the appearance probability of "1" is ⅓₃=about 18%. Therefore, the pits 11 are discretely formed in only a region of the optical disk shown in FIG. 10 which is 20% of the overall area on the recording track T2. That is, the probability for the beam spot to pass through positions above the pits formed on the recording track T2 when seeking is performed is, at the highest, lower than 20%.

The foregoing optical disk generates signals required to perform tracking control from only light reflected and diffracted by the pits 11. As described above, the probability for the beam spot to pass through positions above the pits 11 when seeking is performed is, at the highest, lower than 20%. Therefore, the signals required to perform tracking control cannot stably and continuously be obtained from the foregoing optical disk.

On the other hand, the optical disk according to this embodiment has a structure such that the pits 1 are formed at positions corresponding to "0" of the information signal. The pits 1 are not formed at positions corresponding to "1" of the information signal. That is, the optical disk according to this embodiment has a structure such that data obtained by inverting "0" and "1" of the original information signals is recorded. For example, a information signal in the form as "001000100100" is recorded on the disk as "110111011011".

Figure 11:
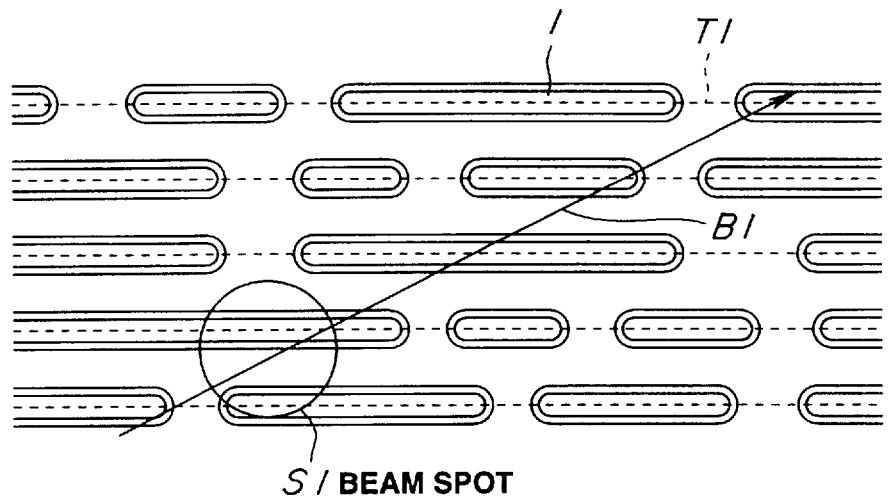
FIG. 11 is a schematic view showing the optical disk according to the present invention.

The optical disk corresponding to the optical disk shown in FIG. 10 and disclosed as described above and according to this embodiment is shown in FIG. 11. FIG. 11 is a schematic view showing a read-only region of the optical disk according to this embodiment, in which the pits 1 formed on the recording tracks 1 are shown similarly to FIG. 10. A circle S1 shown in FIG. 11 indicates a beam spot made incident when reproduction is performed, and an arrow B1 indicates a state of movement of the beam spot when seeking is performed.

When "0" and "1" of the original information signal are inverted, the appearance probability of "1" is made to be about 82%. Therefore, the pits 1 are, in the optical disk shown in FIG. 11, formed in a region which exceeds 80% of the area of the recording tracks T1. That is, a significantly high probability of 80% or higher is realized by the optical disk according to this embodiment for the beam spot to pass through positions above the pits 1 formed on the recording tracks T1 when the seeking operation is performed.

The optical disk according to this embodiment is arranged to generate the signals required to perform tracking control from only light reflected and diffracted by the pits 1. As described above, a significantly high probability of 80% or higher is realized for the beam spot to pass through positions above the pits 1 when the seeking operation is performed. As a result, the optical disk according to this embodiment enables the signals required to perform tracking control to stably and continuously be obtained with a satisfactorily high level.

As described above, the optical disk according to this embodiment enables the signals required to perform tracking control to be stably and continuously obtained with a satisfactorily high level even if the groove is omitted from the read-only region and the signals required to perform tracking control are obtained from only the pits 1. Since the optical disk according to this embodiment has a simple structure because no groove is formed in the read-only region, the structure of the stamper which is a metal master plate for molding a substrate can significantly be simplified and the process for forming the substrate by using the foregoing stamper can easily be performed. As a result, the manufacturing yield can be improved, thus causing the cost to be reduced significantly.

When the present invention is applied to a read-only optical disk having no recording region, the fact that the groove is not required to be formed enables the stamper to be manufactured by a 1-beam cutting apparatus similarly to the read-only optical disk such as the digital audio disk. Therefore, the read-only optical disk according to the present invention can be manufactured by using the conventional manufacturing apparatus for the digital audio disks. As a result, the manufacturing cost can significantly be reduced.

Note that the present invention can widely be applied to optical recording media having pits forming projections and pits for indicating information signals. Therefore, the present invention is not limited to the read-only optical disk having only the read-only region which is the region in which information signals have been previously written as the pits.

That is, the present invention may be applied to also an optical disk of a type having both of a read-only region in which information signals have been written as pits and a recording region on which information signals can be written. In this case, grooves are omitted from the read-only region and the pits to be formed in the read-only region are formed at positions corresponding to "0" of the information signals.

Figure 12:
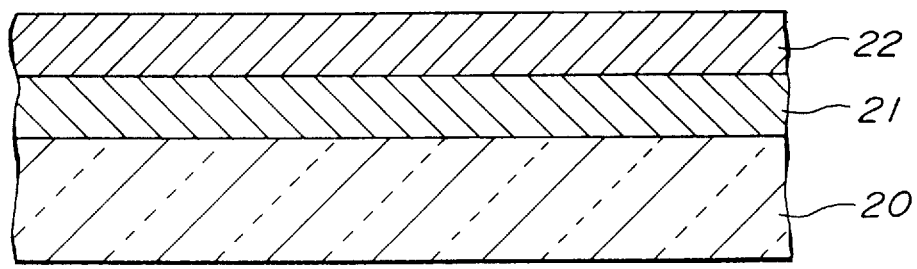
FIG. 12 is a cross sectional view showing an example of a read-only region of the optical disk.

The read-only region in the optical disk, as shown in FIG. 12, has a structure formed such that, for example, a reflecting film 21 made of metal, such as Al, Ag, Au, Cu, Ti or Ni or their alloy is formed on a transparent substrate 20 made of polycarbonate (PC), polymethyl methaacrylate (PMMA), polyvinyl chloride (PVC) or glass. Moreover, a protective film 22 made of ultraviolet hardening resin or the like is formed on the reflecting film 21.

Figure 13:
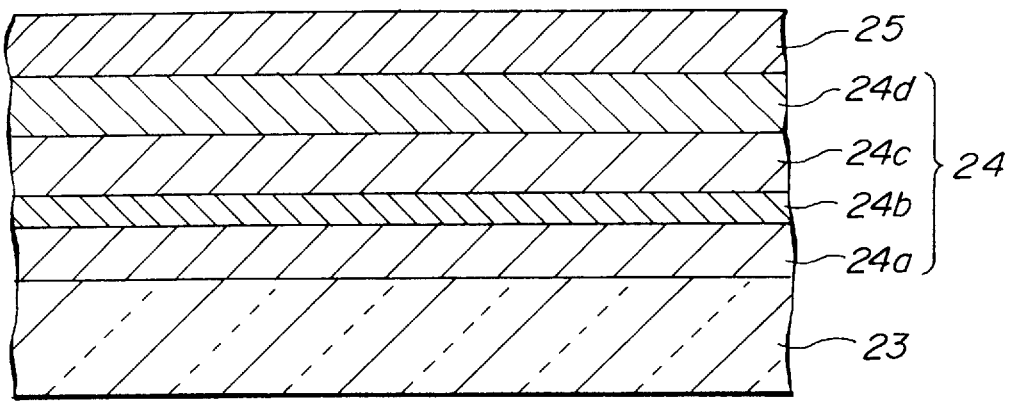
FIG. 13 is a cross sectional view showing an example of a recording region of a magneto-optical disk.

The recording region of a magneto-optical disk is formed, for example, as shown in FIG. 13 such that a magneto-optical recording layer 24 is formed on a transparent substrate 23 made of polycarbonate (PC), polymethyl methaacrylate (PMMA), polyvinyl chloride (PVC) or glass. Moreover, a protective film 25 made of ultraviolet hardening resin is formed on the magneto-optical recording layer 24. It is preferable that the magneto-optical recording layer 24 be a four-layered laminate formed by sequentially laminating a first dielectric film 24a made of, for example, SiN, SiO$_2$ or ZnS; a film 24b made of an alloy of rare-earth element and transition metal, such as TbFeCo, GdFeCo, GdTbFeCo or DyFeCo; and a reflecting film 24d made of metal, such as Al, Ag, Au, Cu, Ti or Ni.

Figure 14:
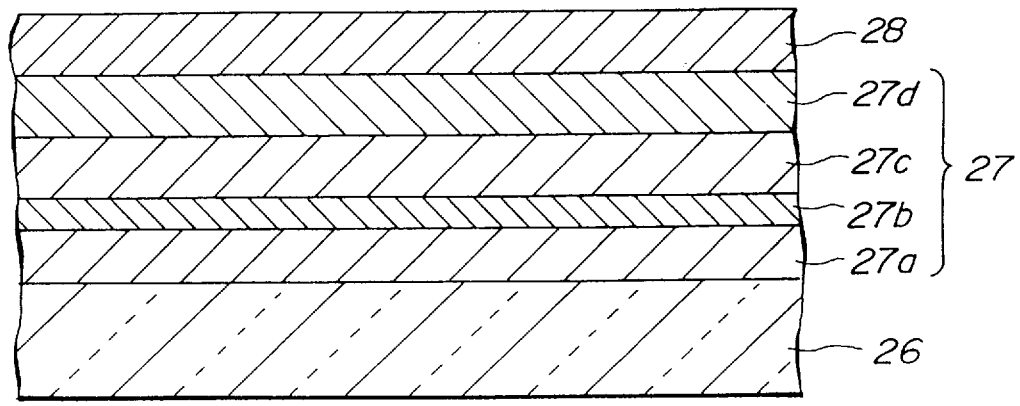
FIG. 14 is a cross sectional view showing an example of a recording region of a phase change optical disk.

The recording region of the phase change optical disk is, for example, as shown in FIG. 14, formed such that a phase-change type recording layer 27 is formed on a transparent substrate 26 made of polycarbonate (PC), polymethyl methaacrylate (PMMA), polyvinyl chloride (PVC) or glass. Moreover, a protective film 28 made of ultraviolet hardening resin or the like is formed on the phase-change type recording layer 27. It is preferable that the phase-change type recording layer 27 be a four-layered laminate formed by sequentially laminating a first dielectric film 27a made of, for example, ZnS, SiO$_2$ or SiN or their alloy; a binary or ternary chalcogen metal alloy film 27b containing any one of Ge, Sb, Se, Bi and Te; a second dielectric film 27c made of ZnS, SiO$_2$ or SiN or their alloy; and a reflecting film 27d made of Al, Ag, Au, Cu, Ti or Ni or their alloy.

Data recorded on the optical disk having the above-mentioned structure according to this embodiment is reproduced by detecting the positions at which the pit 1 is not formed, that is, the positions between the pits 1. Therefore, the optical disk according to this embodiment has a structure such that the intervals between the pits 1 are reduced as compared with the conventional optical disk. Accordingly, the optical disk according to this embodiment raises a necessity that the stamper which is a metal master plate for molding the substrate is manufactured in such a manner that a satisfactory long distance is maintained between the pits 1 so as to form the pits 1 sufficiently apart from each other.

When the stamper is manufactured, the pits 1 are written on the original plate by a cutting laser. The ratio of time for which the cutting laser beam is emitted with respect to time corresponding to one channel clock is defined to be light emission duty for the cutting laser. If portions "1" are continued and the pits 1 are continuously formed, the light emission duty may be 100%. If a final "1" portion is formed to follow the successive portions "1", the light emission duty must have a relatively short value in order to maintain the distance from the next pit 1.

Figure 15:
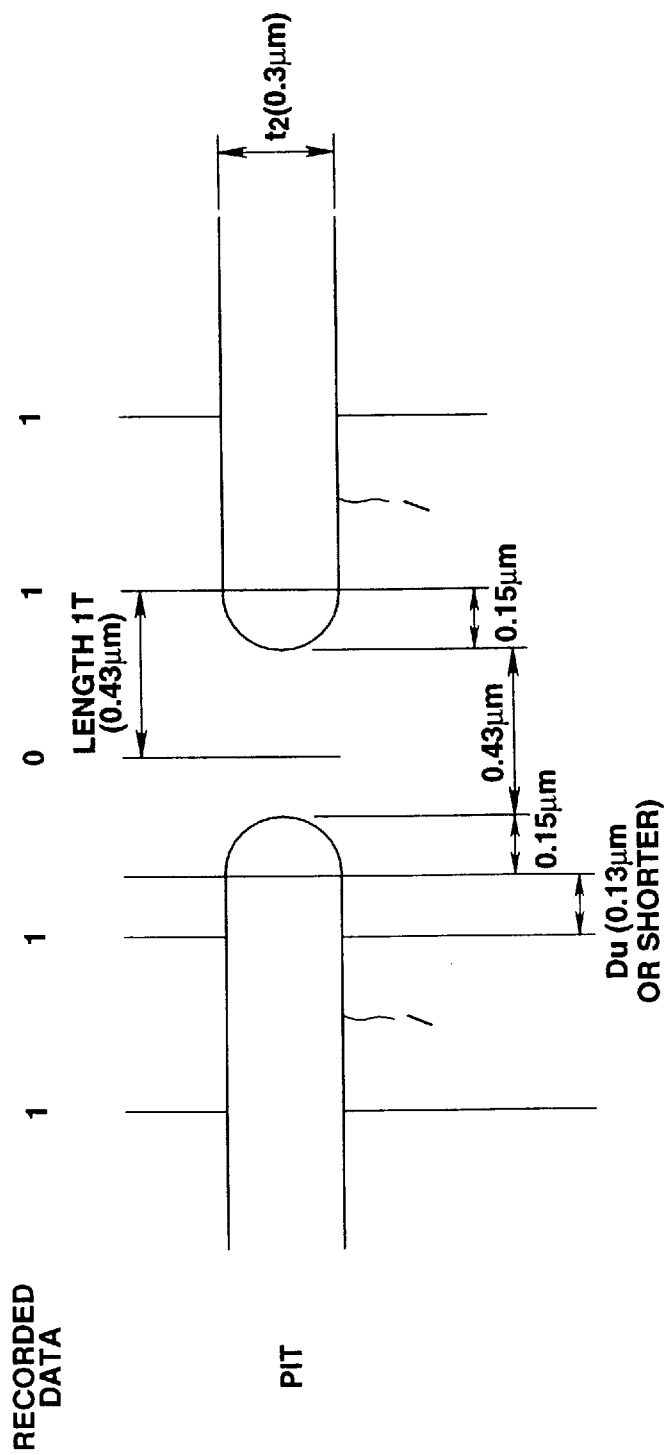
FIG. 15 is a schematic view showing light emission duty.

Specifically, since the double density MO standard has the length corresponding to one channel clock, that is, length 1T, which is 0.43 $\mu$m, the distance between pits 1 must have the foregoing length, as shown in FIG. 15.

The optical disk according to this embodiment has a structure such that the width t2 of the pit 1 is made to be included in a range from 0.3 to 0.6 $\mu$m. Among the foregoing values, the largest light emission duty can be employed when the width t2 of the pit 1 is made to be 0.3 $\mu$m, as shown in FIG. 15. It is preferable that length Du corresponding to the light emission duty be 0.13 $\mu$m or shorter also in consideration of the influence of the next pit 1. When the length Du corresponding to the light emission duty is 0.13 $\mu$m, the light emission duty is 0.13 $\mu$m/0.43 $\mu$m=about 30%. Therefore, it is preferable that the light emission duty be restricted to be about 30% or lower.

The operation for reproducing an information signal from the optical disk having the above-mentioned structure according to this embodiment will now be described while making a comparison with the conventional optical disk.

Figure 16:
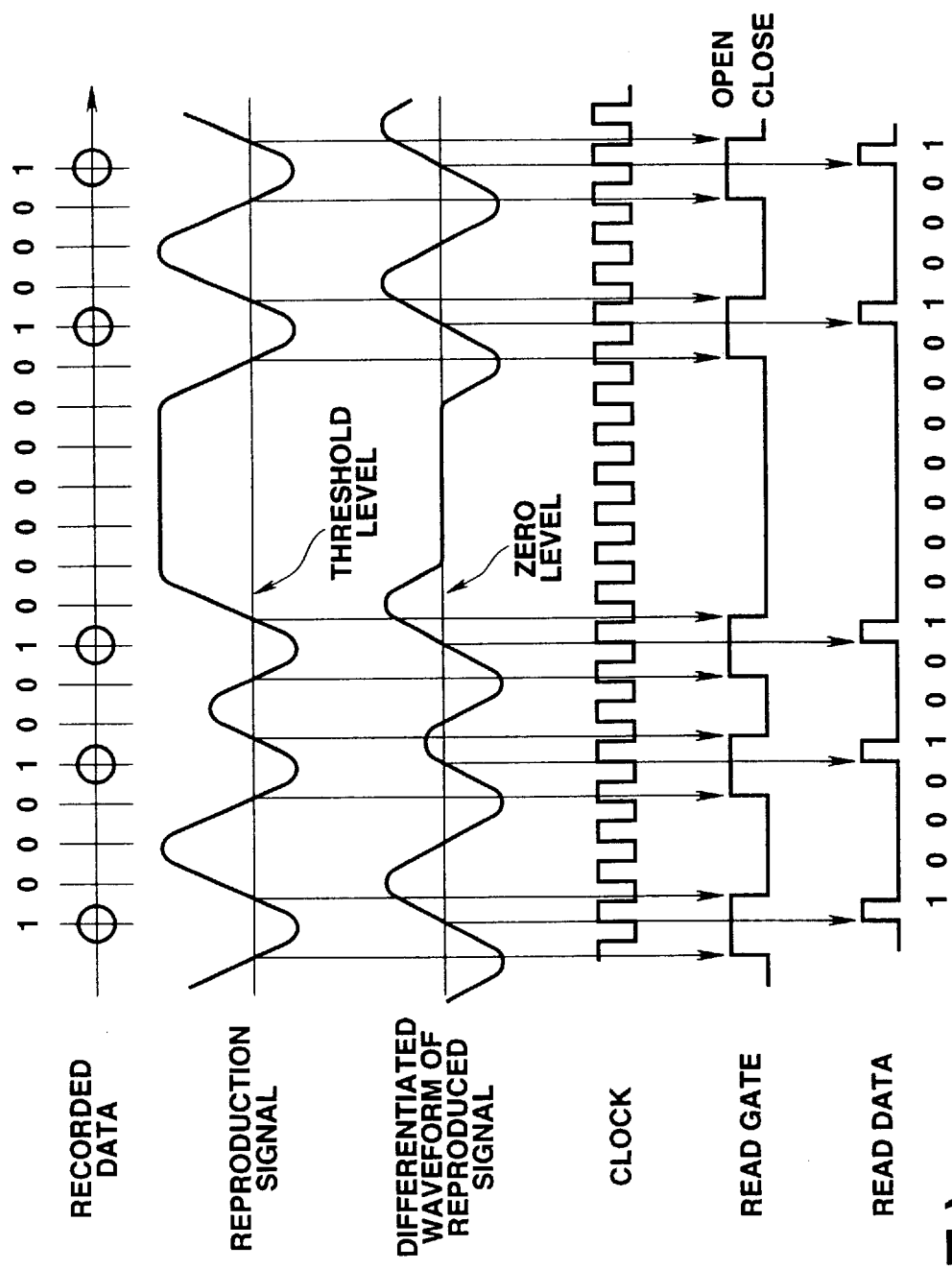
FIG. 16 is a diagram showing a state of a signal process when the conventional optical disk is used.

The conventional optical disk is structured to reproduce an information signal by detecting the positions at which pits are formed. That is, when the information signal is reproduced from the conventional optical disk, a reproduction signal detected as a quantity of reflected light from the optical disk is monitored. When the level of the reproduction signal is made to be not higher than a threshold level, the waveform of the reproduction signal is differentiated and the read gate is opened, as shown in FIG. 16. When the level of the differentiated waveform of the reproduction signal is zero, a bit is provided for read data. As a result, read data corresponding to data recorded on the optical disk is obtained as a pulse signal. Since data recorded on the optical disk is retained to be the original information signal, read data corresponding to the original information signal can be obtained as a result of the foregoing process.

Inversely to the conventional optical disk, the optical disk according to this embodiment is structured to read data by detecting portions in which no pit 1 is formed. Therefore, the reproduction signal obtainable from the optical disk according to this embodiment has a polarity opposite to that of the reproduction signal obtainable from the conventional optical disk.

Figure 17:
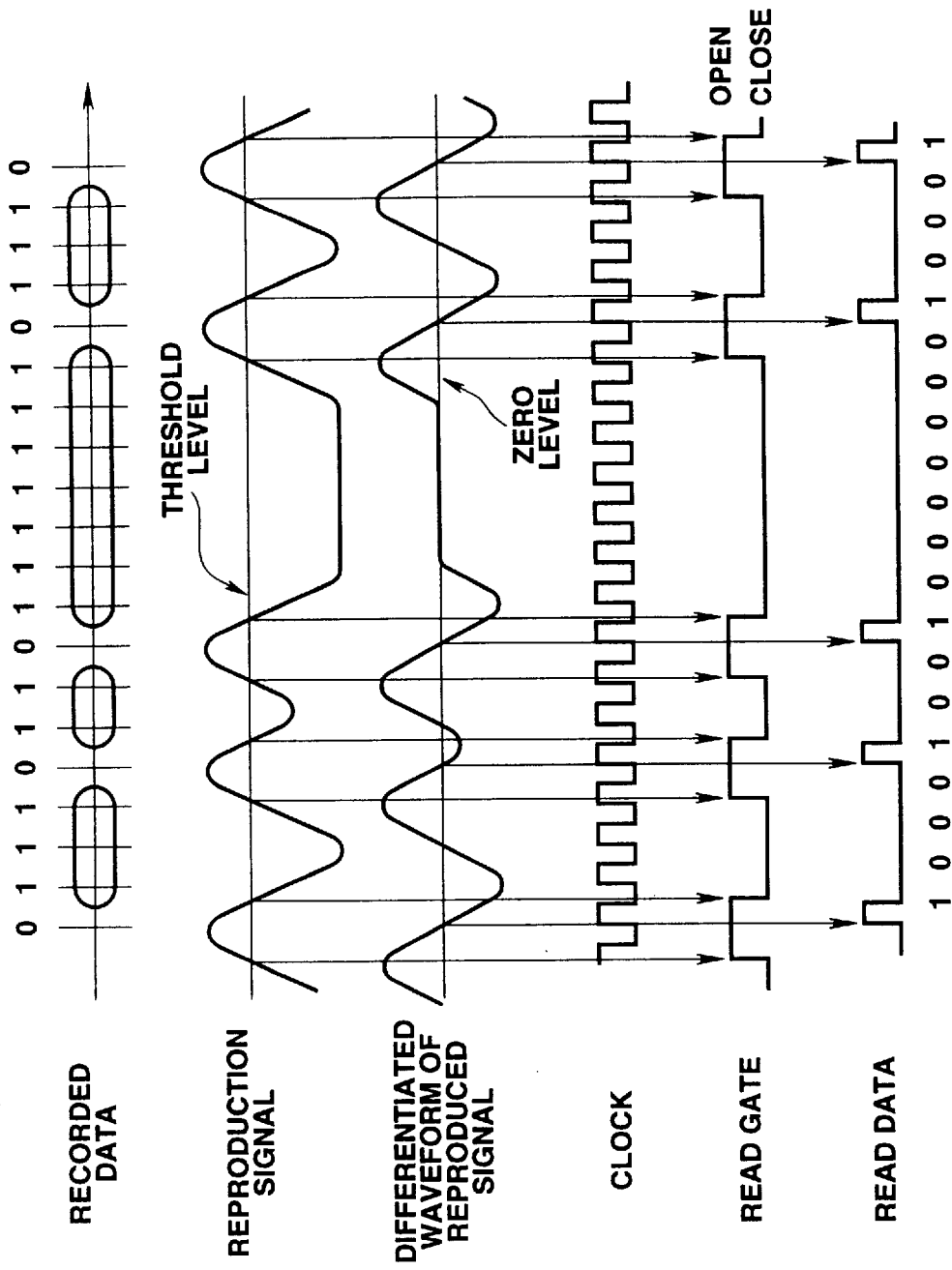
FIG. 17 is a diagram showing a state of a signal process when the optical disk according to the present invention is used.

Therefore, when the information signal is reproduced from the optical disk according to this embodiment, a reproduction signal which is detected as a quantity of light reflected from the optical disk is monitored. When the level of the reproduction signal is made to be the threshold level or higher as shown in FIG. 17, the waveform of the reproduction signal is differentiated and the read gate is opened. When the level of the differentiated waveform of the reproduction signal is zero, a bit is provided for the read data. As a result, data obtained by inverting data recorded on the optical disk, that is, read data corresponding to the original information signal can be obtained as a pulse signal.

As described above, when the information signal is reproduced from the optical disk according to this embodiment, the read gate for detecting the signal is opened/closed conversely to the conventional optical disk. Moreover, the same procedure as that for the conventional optical disk is employed to process the signal except the read gate. Thus, read data corresponding to the original information signal can be obtained.

A drive unit adaptable to the optical disk according to this embodiment can be realized by simply modifying the drive unit adapted to the conventional optical disk. That is, when an information signal is reproduced from the optical disk according to this embodiment, the opening/closing of the read gate is simply required to be converse. Therefore, a circuit for inverting the polarity of the read gate is provided for the drive unit adapted to the conventional Optical disk so that a drive unit adaptable to the optical disk according to this embodiment is realized. As described above, the present invention does not require a considerable change of the drive unit. Thus, a drive unit adaptable to the optical disk according to the present invention can be realized by performing a simple modification.

An example of the structure of a drive unit adaptable to the optical disk according to the present invention will now be described with reference to FIG. 18. Note that the drive unit to be described hereinbelow has a structure having only a reproduction system for reproducing an information signal from the optical disk. As a matter of course, the drive unit may have a function for writing data on the optical disk.

Figure 18:
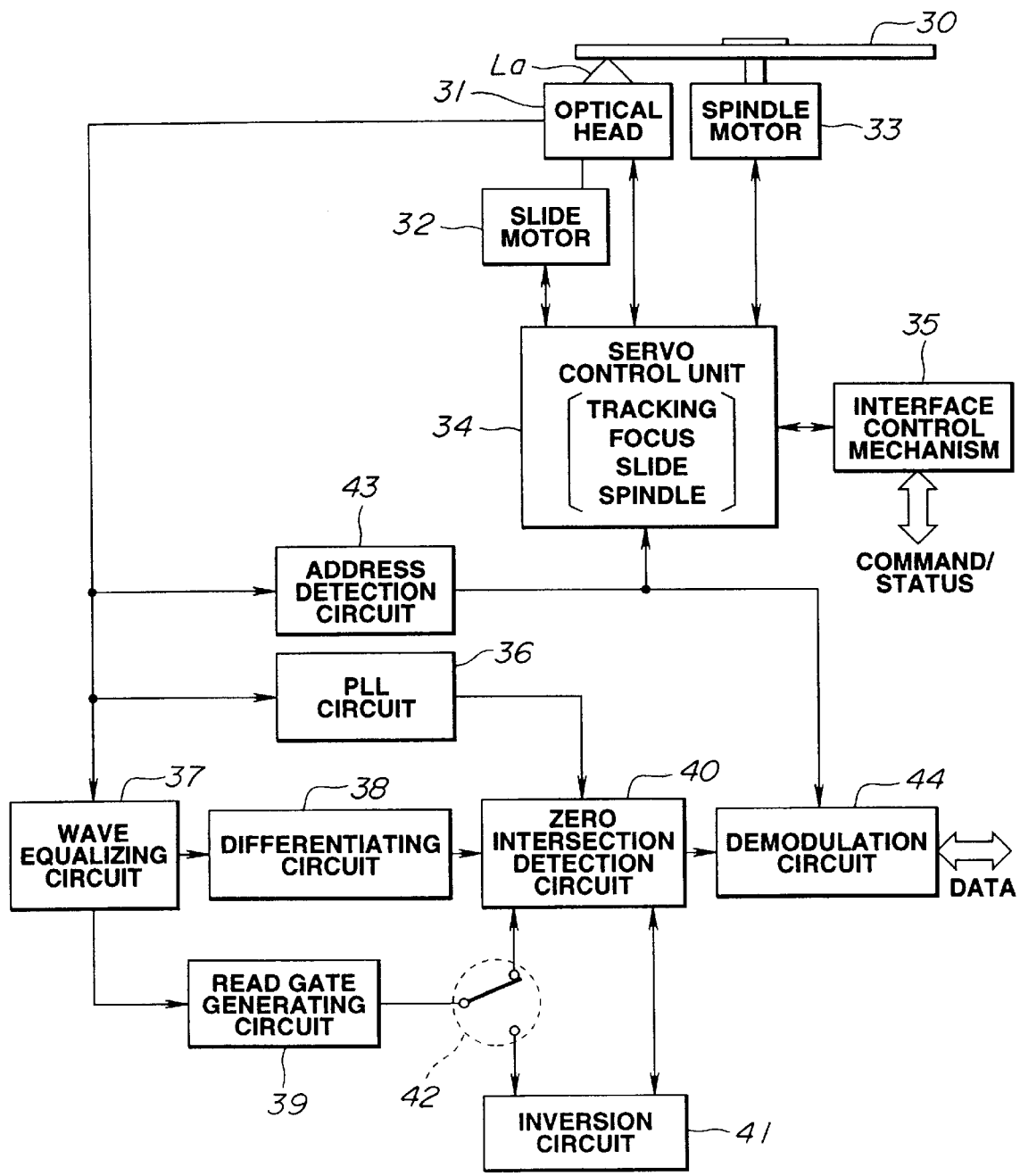
FIG. 18 is a block diagram showing an example of the structure of a drive unit adaptable to the optical disk according to the present invention.

The drive unit according to this embodiment, as shown in FIG. 18, has an optical head 31 for detecting a signal from an optical disk 30, a slide motor 32 for, in parallel, moving the optical head 31, a spindle motor 33 for rotating the optical disk 30, a servo-system control unit 34 for performing a servo process, and an interface control mechanism 35 for controlling the interface with an external circuit.

The optical head 31 irradiates the optical disk 30 with a laser beam La to detect light reflected by the optical disk 30 to read signals from the optical disk 30. The signals from the optical disk 30 are detected from only light reflected and diffracted by the pits. Signals obtained by the optical head 31 are supplied to the servo-system control unit 34. Among the signals obtained by the optical head 31, the reproduction signals detected as the quantities of reflection from the optical disk 30 are supplied to a waveform equalizing circuit 37 and the like.

The servo-system control unit 34 generates a tracking servo signal and a focus servo signal in response to the signal detected by the optical head 31 to supply the signals to the optical head 31. In response to the supplied signals, the optical head 31 performs the tracking control and the focus control.

In accordance with a command and the like supplied through the interface control mechanism 35, the servo-system control unit 34 generates a control signal for instructing the optical head 31 to be moved in parallel in a radial direction of the optical disk 30 and supplies the control signal to the slide motor 32. If necessary, the servo-system control unit 34, at this time, obtains information about the address and the like from the address detection circuit 43 to be described later when it generates the control signal. In response to the control signal, the slide motor 32, in parallel, moves the optical head 31 in the radial direction of the optical disk 30.

In accordance with a command and the like supplied through the interface control mechanism 35, the servo-system control unit 34 generates a control signal for instructing the optical head 31 to be rotated and supplies the control signal to the spindle motor 33. If necessary, the servo-system control unit 34, at this time, obtains information about the address and the like from the address detection circuit 43 when it generates the control signal. In response to the control signal, the spindle motor 33 rotates the optical disk 30 at a predetermined speed.

The interface control mechanism 35 controls the interface for supplying/receiving commands/status to and from the external circuit. Specifically, the command for, in parallel, moving the optical head 31 in the radial direction of the optical disk 30, a command for instructing to rotate the optical disk 30 and the like are supplied to the servo-system control unit 34 through the interface control mechanism 35.

The drive unit according to this embodiment has a PLL circuit 36 for oscillating predetermined clocks; a waveform equalizing circuit 37 for subjecting the reproduction signal to a wave equalizing process to prevent interference between codes; a differentiating circuit 38 for differentiating the reproduction signal; a read gate generating circuit 39 for generating a read gate signal; a zero intersection detection circuit 40 for detecting a zero-level intersection point of the differentiated reproduction signal; an inversion circuit 41 for inverting the read gate signal; a switch 42 disposed at an output portion from the read gate generating circuit 39; an address detection circuit 43 for detecting address information from the reproduction signal; and a demodulation circuit 44 for demodulating a signal output from the zero intersection detection circuit 40.

The PLL circuit 36 oscillates predetermined clocks when an information signal is reproduced from the optical disk 30 to supply the clocks to the zero intersection detection circuit 40.

The waveform equalizing circuit 37 subjects the reproduction signal detected by the optical head 31 to the wave equalizing process to prevent interference between codes and supplies the reproduction signal subjected to the wave equalizing process to the differentiating circuit 38 and the read gate generating circuit 39.

The differentiating circuit 38 differentiates the reproduction signal subjected to the wave equalizing process by the waveform equalizing circuit 37. Then, the differentiating circuit 38 supplies a signal denoting a result of the differentiation to the zero intersection detection circuit 40.

The read gate generating circuit 39 generates a read gate signal in response to the reproduction signal subjected to the wave equalizing process by the waveform equalizing circuit 37.

The read gate generating circuit 39 generates the read gate signal for opening the read gate when the level of the reproduction signal is not higher than the threshold level and closing the read gate when the level of the reproduction signal is higher than the threshold level.

The switch 42 switches the read gate signal supplied from the read gate generating circuit 39 to be directly supplied to the zero intersection detection circuit 40 or to be supplied to the zero intersection detection circuit 40 through the inversion circuit 41. The switch 42 is set in such a manner that the read gate supplied from the read gate generating circuit 39 is directly supplied to the zero intersection detection circuit 40 in a case where the optical disk from which data must be reproduced is the conventional optical disk having pits formed at positions corresponding to "1" of the information signal. In a case where the optical disk is the optical disk according to this embodiment having the structure such that pits are formed at positions corresponding to "0" of the information signal, the switch 42 is set in such a manner that the read gate supplied from the read gate generating circuit 39 is supplied to the zero intersection detection circuit 40 through the inversion circuit 41.

When a signal is supplied to the inversion circuit 41, the inversion circuit 41 inverts the polarity of the supplied signal to output the signal. Therefore, when a read gate signal for opening the read gate when the reproduction signal is not higher than the threshold level and closing the read gate when the reproduction signal is higher than the threshold level is supplied to the inversion circuit 41, the inversion circuit 41 converts the supplied read gate signal into a read gate signal for opening the read gate when the reproduction signal is not lower than the threshold level and closing the read gate when the reproduction signal is lower than the threshold level so as to output the read gate signal.

The zero intersection detection circuit 40 generates a pulse signal indicating data read from the optical disk 30 in response to the read gate signal, the clocks supplied from the PLL circuit 36 and the signal supplied from the differentiating circuit 38. In a case where the optical disk from which data must be reproduced is the conventional optical disk having pits formed at positions corresponding to "1" of the information signal, the zero intersection detection circuit 40 generates the pulse signal indicating read data, as described with reference to FIG. 16. In a case where the optical disk is the optical disk according to this embodiment having the structure such that pits are formed at positions corresponding to "0" of the information signal, the zero intersection detection circuit 40 reads the pulse signal indicating read data, as described with reference to FIG. 17. The zero intersection detection circuit 40 supplies the generated pulse signal to the demodulation circuit 44.

The address detection circuit 43 detects information of the address from the reproduction signal detected by the optical head 31. The address detection circuit 43 supplies information of the address to the servo-system control unit 34 and the demodulation circuit 44.

The demodulation circuit 44 is supplied with the address signal from the address detection circuit 43 to subject the pulse signal supplied from the zero intersection detection circuit 40 to a demodulation process. Then, the demodulation circuit 44 transmits data subjected to the demodulation process to the external circuit.

The drive unit adaptable to the optical disk according to this embodiment has the same structure as that of the conventional drive unit except for the inversion circuit 41 and the switch 42 being provided additionally. Therefore, the drive unit adaptable to the optical disk according to this embodiment can be realized only by adding the inversion circuit 41 and the switch 42 to the drive unit adapted to the conventional optical disk. That is, the present invention does not require a great change of the drive unit. Only by simply modifying the conventional drive unit, the drive unit adaptable to the optical disk according to the present invention can be realized.

Although the drive unit according to this embodiment has the structure such that the inversion circuit 41 and the switch 42 are disposed between the read gate generating circuit 39 and the zero intersection detection circuit 40, the inversion circuit 41 and the switch 42 may be disposed between the differentiating circuit 38 and the zero intersection detection circuit 40. Also in this case, the information signal can be reproduced from the optical disk according to this embodiment, similarly to the foregoing drive unit.

As can be understood from the foregoing description, the optical recording medium according to the present invention has the structure such that the region having the pits is larger than the region in which no pit is formed. Therefore, signals required to perform tracking control and having a satisfactorily high level can be obtained even if the groove is omitted in order to improve the productivity.

That is, according to the present invention, an optical recording medium can be provided which exhibits excellent productivity because no groove is formed in the region in which the pit is formed and which enables signals required to perform tracking control and having satisfactorily high level to be obtained.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical recording medium comprising pits formed in at least a portion of recording tracks and indicating information signals, wherein a refractivity of a substrate of said optical recording medium is n and the wavelength of light for use to reproduce data is $\lambda$, the depth of the pits is included in a range from $\lambda/(4n)$ to $\lambda/(2n)$ and the width of each pit is included in a range from 0.3 to 0.6 $\mu$m, and the number of regions in the recording tracks in which the pits are formed is larger than the number of regions in which no pit is formed.

2. An optical recording medium according to claim 1, wherein the pits are formed at positions corresponding to "0" of the information signal.

3. An optical recording medium according to claim 1, wherein when wavelength $\lambda$ of light for use to reproduce data is 780 nm, a push-pull signal PP and a cross track signal CTS each of which is regulated with a quantity of returned light are, in a case where a polarization direction of light for use to reproduce data is in parallel to the tracks, included in the following ranges:

0.35≦push-pull signal PP≦0.90

0.12≦cross tracking signal CTS≦0.60 and in a case where the polarization direction of light for use to reproduce data is perpendicular to the tracks, the push-pull signal PP and the cross track signal CTS are included in the following ranges:

0.22≦push-pull signal PP≦0.70

0.20≦cross tracking signal CTS≦0.75.

4. An optical recording medium according to claim 1, wherein a data layer is formed on a transparent substrate made of a material selected from the group of materials consisting of polycarbonate (PC), polymethyl methaacrylate (PMMA), polyvinylchloride (PVC) and glass.

5. An optical recording medium according to claim 4, wherein a protective film of ultraviolet hardening resin is formed on the data layer.

6. An optical recording medium according to claim 5, wherein said data layer comprises a reflecting film made of a metal selected from the group of metals consisting of Al, Ag, Au, Cu, Ti, Ni, and alloys thereof.

7. An optical recording medium according to claim 6, wherein said data layer further comprises a film made of an alloy of a rare earth element and a transition metal selected from the group of materials consisting of TbFeCo, GdFeCo, GdTbFeCo and DyFeCo.

8. An optical recording medium according to claim 7, wherein said data layer further comprises a dielectric film made of a material selected from the group of materials consisting of SiN, $SiO_2$, ZnS and alloys thereof.

9. An optical recording medium according to claim 8, wherein said data layer further comprises one of a binary and a ternary chalcogen metal alloy films comprising an element selected from the group of elements consisting of Ge, Sb, Se, Bi, Te and alloys thereof.

10. An optical disk according to claim 1, wherein a length corresponding to a light emission duty is less than substantially 0.13 µm.

11. An optical disk according to claim 1, wherein regions of the optical disk wherein pits are formed to occupy a greater area of the recording tracks than regions wherein no pit is formed.

12. An optical disk according to claim 11, wherein said regions of the optical disk wherein pits are formed to occupy substantially 80% of the area of the recording track.

13. An optical disk according to claim 11, wherein said regions of the optical disk wherein pits are formed to occupy an area of the recording track between 60% and 90% of the total area of the recording track.

14. An optical disk according to claim 11, wherein said regions of the optical disk wherein pits are formed to occupy an area of the recording track between 75% and 90% of the total area of the recording track.

15. An optical disk according to claim 11, wherein said regions of the optical disk wherein pits are formed to occupy an area of the recording track between 80% and 85% of the total area of the recording track.

16. An optical recording/reproducing apparatus including an optical recording medium and a drive unit, the optical recording medium comprising pits formed in at least a portion of recording tracks and indicating information signals, wherein a refractivity of a substrate of said optical recording medium is n and the wavelength of light for use to reproduce data is $\lambda$, the depth of the pits is included in a range from $\lambda/(4n)$ to $\lambda/(2n)$ and the width of each pit is included in a range from 0.3 to 0.6 µm, the drive unit comprising a PLL circuit, a waveform equalizing circuit, a differentiating circuit, a read gate generating circuit, a zero intersection detection circuit, an address detection circuit and a demodulation circuit, wherein the improvement comprises that the number of regions in the recording tracks of the optical recording medium in which the pits are formed is larger than the number of regions in which no pit is formed, and wherein the improvement further comprises an inversion circuit for inverting a read gate polarity and a switch.

17. An optical disk according to claim 16, wherein regions of the optical disk wherein pits are formed to occupy a greater area of the recording tracks than regions wherein no pit is formed.

18. An optical recording medium comprising pits formed in at least a portion of recording tracks and indicating information signals, wherein a refractivity of a substrate of said optical recording medium is n and the wavelength of light for use to reproduce data is $\lambda$, the depth of the pits is included in a range from $\lambda/(4n)$ to $\lambda/(2n)$ and the width of each pit is included in a range from 0.3 to 0.6 µm, and regions of the optical disk wherein pits are formed to occupy a greater area of the recording tracks than regions wherein no pit is formed.

19. An optical recording medium according to claim 18, wherein the pits are formed at positions corresponding to 11011 of the information signal.

20. An optical recording medium according to claim 18, wherein when wavelength $\lambda$ of light for use to reproduce data is 780 nm, a push-pull signal PP and a cross track signal CTS each of which is regulated with a quantity of returned light are, in a case where a polarization direction of light for use to reproduce data is parallel to the tracks, included in the following ranges:

$0.35 \leq$ push-pull signal PP $\leq 0.90$ $0.2 \leq$ cross tracking signal CTS $\leq 0.60$ and in a case where the polarization direction of light for use to reproduce data is perpendicular to the tracks, the push-pull signal PP and the cross track signal CTS are included in the following ranges:

$0.22 \leq$ push-pull signal PP $\leq 0.70$ $0.20 \leq$ cross tracking signal CTS $\leq 0.75$.

* * * * *